United States Patent [19]

Alexius et al.

[11] Patent Number: 5,074,521
[45] Date of Patent: Dec. 24, 1991

[54] HIGH FORCE-GAIN VALVE

[75] Inventors: Richard C. Alexius, Orlando; William R. Spencer, Longwood, both of Fla.

[73] Assignee: Martin Marietta Corporation, Bethesda, Md.

[21] Appl. No.: 505,135

[22] Filed: Apr. 5, 1990

[51] Int. Cl.$^5$ .............................................. F16K 31/22
[52] U.S. Cl. .................................. 251/63.5; 251/155; 251/282
[58] Field of Search ................... 251/63.5, 153, 155, 251/282; 239/456, 506, 518

[56] References Cited

U.S. PATENT DOCUMENTS

| | | |
|---|---|---|
| 3,837,356 | 9/1974 | Selep et al. |
| 3,964,507 | 6/1976 | Jandrasi et al. ............ 137/375 |
| 4,029,294 | 6/1977 | McCaskill et al. |
| 4,081,174 | 3/1978 | Johnson et al. |
| 4,341,370 | 7/1982 | Banks . |
| 4,363,465 | 12/1982 | Morrill . |
| 4,378,817 | 4/1983 | Houston . |
| 4,383,546 | 5/1983 | Walters, Jr. . |
| 4,477,056 | 10/1984 | Alexius ....................... 251/282 |
| 4,487,393 | 12/1984 | Eagen . |
| 4,500,070 | 2/1985 | Riollet et al. ................. 251/282 |
| 4,577,654 | 3/1986 | Pringle ........................ 137/219 |
| 4,643,395 | 2/1987 | Williams, Jr. . |

FOREIGN PATENT DOCUMENTS 2733854 4/1978 Fed. Rep. of Germany ...... 251/282

Primary Examiner—Gerald A. Michalsky
Attorney, Agent, or Firm—Burns, Doane, Swecker & Mathis

[57] ABSTRACT

A high force gain valve including a fluid inlet, a diverter to absorb pressure and flow forces, a fluid outlet, a moveable gate surrounding the diverter and interposed between inlet and outlet to effect fluid metering, and actuation rods extending out of the pressure region for positioning of the gate. The gate has a beveled sealing edge exposed to the fluid pressure within the housing which permits the gate to be force biased in the open direction. The high force gain valve is designed to reduce tensile and shear stresses so that the valve can be constructed of moderate or low tensile and shear strength materials, such as refractory materials.

24 Claims, 3 Drawing Sheets

FIG. 3
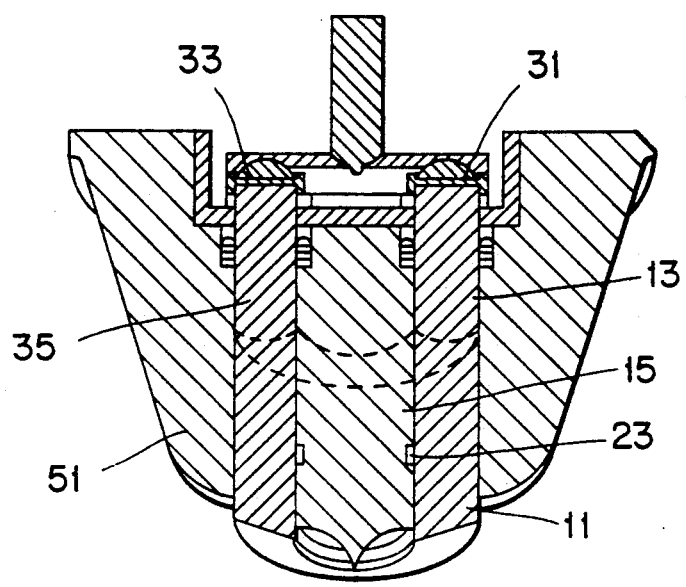
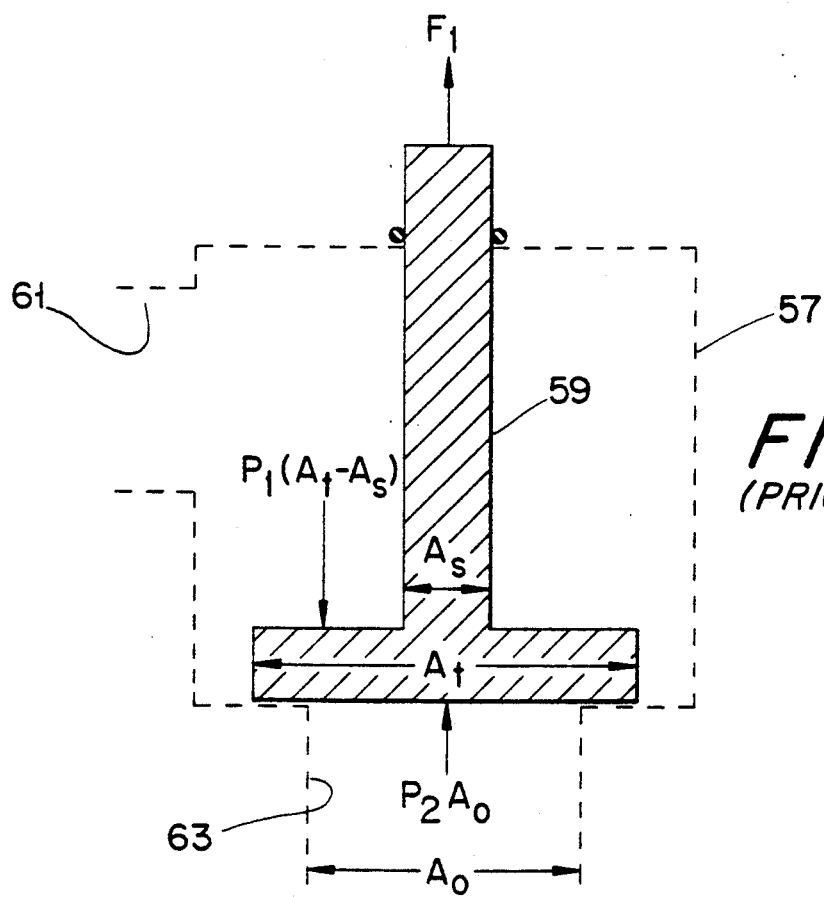
FIG. 4
(PRIOR ART)

HIGH FORCE-GAIN VALVE

BACKGROUND OF THE INVENTION

This invention was made with Government support under contract No. DAAL04-86-C-0040 awarded by the Department of the Army. The Government has certain rights in this invention.

FIELD OF THE INVENTION

This invention relates to valves and particularly to a new and improved high force gain valve designed to be constructed of limited strength materials, for example, refractory materials.

DESCRIPTION OF THE PRIOR ART

Many different types of valves are used to control the flow of fluids. Particular difficulties can arise, however, in valves which are employed to control fluids under high pressure and at extreme temperatures (high or low).

For example, high temperatures severely curtail which materials can be used. Refractory materials have been developed which can withstand the severe environments of rocket motor gases. These materials have good compressive strength, but only moderate tensile strength and very poor shear strength properties. To compensate for the tensile and shear strength properties, valves constructed with these materials have tended to be very large in size. In addition to being bulky, such valves require powerful and slow response "On-Off" actuators.

The design constraints imposed by limitations in material tensile and shear strength also dictate oversized designs in very low (i.e., cryogenic) temperature applications. While a wider variety of materials is available, they are affected by temperature such that they suffer the same drawbacks of shear and tension associated with refractory materials.

Many typical prior art valves also require relatively powerful actuators to overcome the force of the high pressure fluid to which the valve component is exposed. This force varies according to the inlet pressure in the valve. For example, in a typical poppet valve with an output-to-input force ratio of 1.5, the actuator has to supply a 2,000 pound force to open a one-square inch poppet valve against a fluid exerting 3,000 psi. In addition to being expensive, such powerful actuators are heavy, a disadvantage where overall valve weight is an important factor, such as in aircraft or guided missile applications.

Some valve applications may further require rapid opening and closing of the valve with precise positioning of valve components. For example, valves used in directional control thrusters in missile propulsion and control systems necessitate precisely tuned, short bursts of high pressure fluid from the valves. The powerful actuators described earlier as being used in prior art valves to control the flow of high pressure fluid do not lend themselves to quick opening and closing as do lower powered actuators.

Alexius U.S Patent No. 4,477,056 discloses a high force gain valve. The valve is inherently force balanced and can therefore use a smaller, lower-powered and less expensive actuator. The valve, however, does not overcome the problems associated with using low shear stress materials with high pressure fluids.

SUMMARY OF INVENTION

There is thus a need for a valve design which can permit the use of materials having only moderate or poor tensile and shear strength. There is also a need for a valve design using these materials which permits rapid actuation with relatively low-powered actuators.

To meet these needs, the present invention, in accordance with one embodiment thereof, comprises a housing which contains a first and second opening where the first opening is in fluid communication with a fluid source. A cylindrical gate is mounted in the housing opposite the second opening. The gate is hollow and a diverter is disposed inside the gate to divert the fluid out the second opening. The diverter is spaced from the second opening so as to allow an unobstructed flow path through the second opening when the gate is in the open position. The gate is movable and can therefore be positioned in various open and closed positions. The gate is moved by an actuator. A pair of gate rods extend out from the body of the gate and are coupled to the actuator which is located outside the high pressure region.

Since the gate rods project out from the body of the gate, the tension and stress in and around the rods is reduced to compression only and the gate can therefore be constructed out of materials that do have only moderate or poor shear strength properties. This is advantageous in applications where it is desirable to use materials capable of withstanding high or low temperatures, which exhibit high compressive strength but poor shear strength. For high temperatures, these materials include carbonaceous structural materials such as graphite, carbon/carbon, vitreous carbon, and ceramics which are capable of withstanding extremely high or low temperatures.

In the preferred embodiment of the present invention, the gate is pressure biased in the opening direction. This is accomplished by making the projected area of the bottom edge of the gate larger than the projected area of the top of the gate. As a result, the gate is always compressed when it is surrounded by a fluid. The gate is positioned by an actuator which drives the gate and rods in the closing direction only. To open the valve, the actuator need only be decoupled from the gate rods, since the pressure unbalance provides the opening force needed to move the gate to the open position.

Further objects and advantages of the invention will become apparent from the following description taken in conjunction with the accompanying drawings.

BRIEF DESCRIPTION OF THE DRAWINGS

For a detailed description of a preferred embodiment of the invention, reference will now be made to the accompanying drawings wherein:

FIG. 3 is a cross-sectional view of the valve with a gate, a diverter and a flame shield shown in FIG. 1.

FIG. 4 is a cross-sectional view of a prior art poppet valve.

DETAILED DESCRIPTION OF THE PREFERRED EMBODIMENTS

Figure 1:
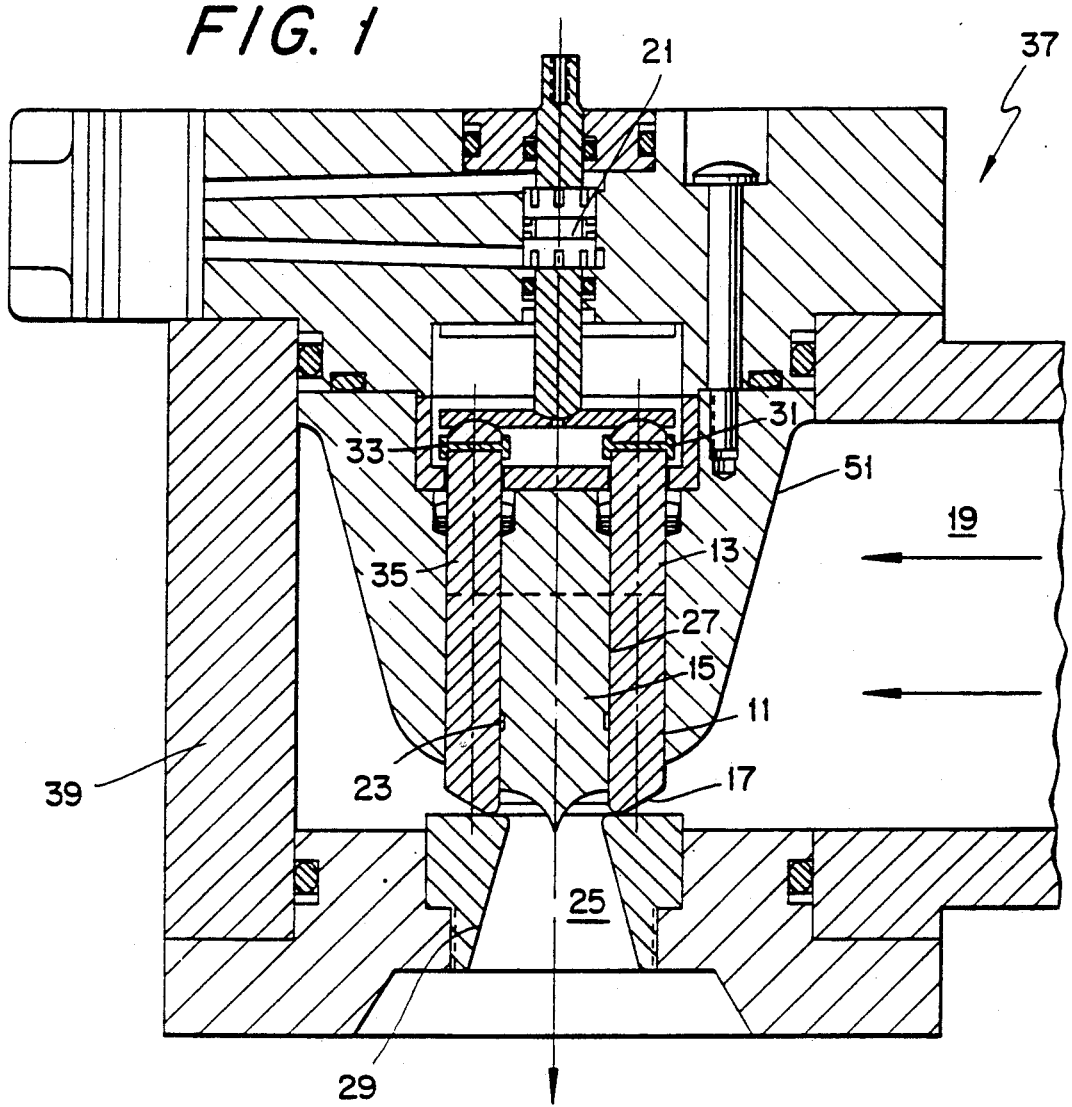
FIG. 1 is a cross-sectional view of a high force gain valve constructed in accordance with a preferred embodiment of the present invention.

Referring now to FIG. 1, there is shown a high force gain valve 37 according to a first embodiment of the present invention which is employed to control the flow of fluid therethrough. The valve 37 contains a housing 39 which contains a first opening 19 and a second opening 25. The first opening 19 is in fluid communication with a fluid source not shown in the figure. As shown in FIG. 1, the valve 37 can be used as a control thruster and therefore a portion of the housing 39 comprises a nozzle 29 which is attached to the housing 39. This is just one embodiment of the present invention, so the valve 37 can have many other uses and thus the housing 39 can have any shape appropriate to such uses.

The valve 37 also contains a diverter 15 to help divert the fluid out the second opening 25. The diverter 15 is connected to the housing 39 opposite the second opening 25 and is spaced from the second opening 25 so as to allow an unobstructed fluid flow path through the second opening 25. In the embodiment shown, the diverter 15 is generally cone shaped with a pointed center directed toward the second opening 25.

The valve 37 contains a gate 11 for controlling the flow of fluid through the valve. The gate 11 is mounted in the housing 39 so that the gate 11 is opposite the second opening 25. Gate 11 surrounds the diverter 15. A seal, such as an O-ring seal 23, can be disposed between the gate 11 and the diverter 15 to prevent fluid from leaking along their interface 27.

The gate 11 is maneuverable to open and closed positions. When the gate 11 is in an open position, the fluid in housing 39 flows past the gate 11 and the diverter 15 and through the second opening 25. When the gate 11 is in the closed position, the sealing edge 17 of the gate 11 rests against a side of the housing 39 so that the sealing edge 17 surrounds the second opening 25 and prevents fluids from flowing out the second opening 25. The gate 11 can be positioned at intermediate positions between the open and closed position to permit a reduced amount of fluid to flow through the second opening 25.

For high temperature applications, the valve 37 may also be provided with a flame shield 51, shown in phantom in FIG. 1 so as not to occlude the other elements of the valve, and in cross section in FIG. 3.

The valve 37 has an actuation means 21 for moving the gate 11 to various open and closed positions. The gate rods 13 and 35 extend out of the high pressure region in housing 39 and are attached to the actuation means by clamps 31 and 33 respectively. In one embodiment, a suitable actuation means 21 is a servohydraulic actuator.

Figure 2:
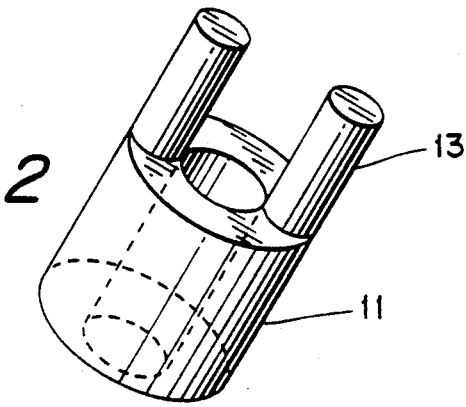
FIG. 2 is a perspective view of a preferred embodiment of a gate and gate rods.

As shown in FIG. 2, a typical gate 11 of the present invention is cylindrical and hollow. In addition, the gate 11 has gate rods 13 protruding out from the body of the gate.

FIG. 3 is a cross-sectional view of a valve according to the present invention. The gate 11 surrounds the diverter 15. A seal, such as an O-ring 23, can be disposed between the gate 11 and the diverter 15 to prevent fluid from leaking along their interface. Gate rods 13 and 35 extend out from the body of gate 37 and are attached to the actuation means (not shown) by clamping means 31 and 33, respectively. The gate 11 is almost entirely surrounded by the flame shield 51. The flame shield 51 helps to protect the gate 11 from the high temperature fluids within the housing. In addition, the flame shield 51 helps to reduce the fluid flow forces on the gate 41.

One advantage of the present invention is that the gate 11 can be designed so that the forces it experiences are almost purely compression and yet can still be biased in the open direction. To explain this, FIG. 4 shows a typical poppet valve found in the prior art. $F_1$ represents the actuation force required to open the poppet 59 when the fluid pressure $P_1$ inside housing 57 is greater than the fluid pressure $P_2$ on the outside of the housing 57. In that case, the opening 61 would be the fluid inlet while the opening 63 would be the fluid outlet. $A_t$ is the total surface area across the poppet, $A_s$ is the area of the stem and $A_o$ is the area of the opening covered by the poppet. In order to open the poppet 59, the actuation force $F_1$ must exceed the force of the fluid pressure $P_1$ acting upon the exposed inner surface area of the poppet 59, $A_t - A_s$.

Where $P_2$ is small relative to $P_1$, as would typically be the case with a fluid valve, the pressure $P_2$ acting upon the exposed outer surface area of the poppet 59, which would equal $A_o$, would offer little assistance to the actuation force $F_1$. Thus, neglecting the effects of $P_2$ and any friction forces involved, the valve actuation means must be capable of providing a force $F_1$ which exceeds the force $$P_1(A_t - A_s)$$

in order to open the poppet 59.

As can readily be appreciated from FIG. 4, the poppet 59 experiences a variety of tensile and shear forces. As one example, there are tensile and shear forces tending to flex the lateral portions of the poppet 59 out of perpendicularity with the stem portion of the poppet 59. These forces would tend to crack or break materials such as refractory materials which exhibit poor strength in resistance to such forces.

Figure 5:
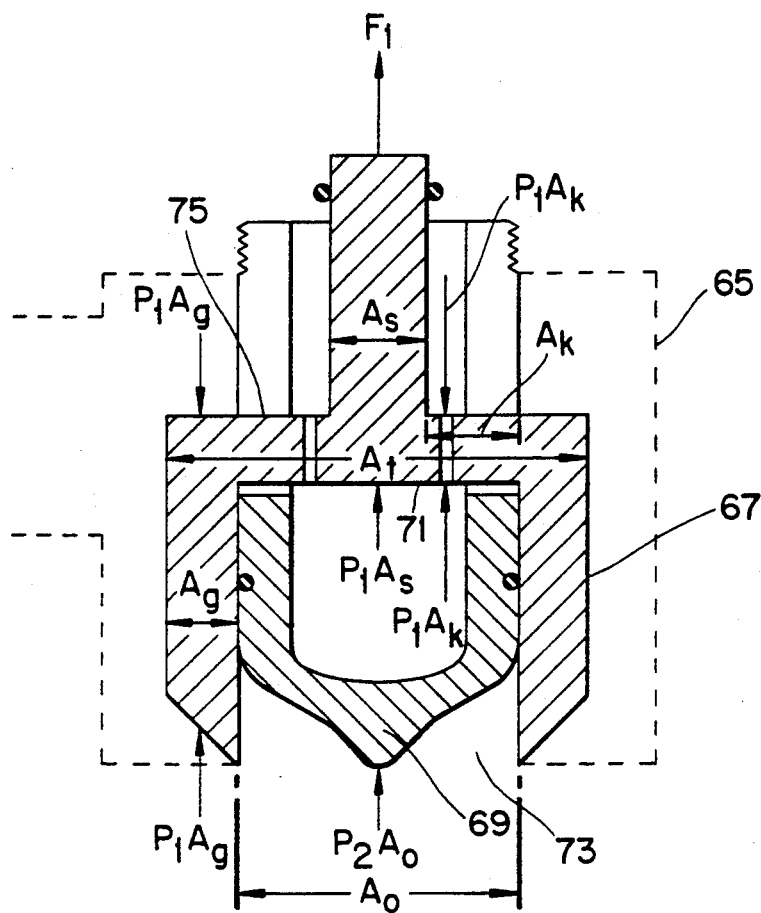
FIG. 5 is a cross-sectional view of a prior art high force gain valve.

FIG. 5 discloses a prior art high force gain valve, shown in Alexius U.S. Pat. No. 4,477,056, which is pressure balanced. The gate 67 is disposed within the housing 65 so that the gate 67 surrounds the opening 73 when the gate is in the closed position. $F_1$ represents the force need to open the gate 67 when the pressure inside housing 65 is greater than the pressure outside the housing 65. $A_s$ represents the area of the stem, $A_g$ represents the area of the gate 67, $A_t$ represents the total surface area of the top of the gate 75 and $A_k$ represents the area of a section of the top of the gate where $A_k = A_t - A_g - A_s$.

The inside of housing 65 is under fluid pressure $P_1$. The gate 67 is hollow and contains a diverter 69 which is also hollow. The top of gate 67 contains several holes which allow the fluid in the housing to fill the hollow section of the diverter. The inside portion of gate 67 is therefore under fluid pressure $P_1$.

Where $P_2$ is small relative to $P_1$, as would typically be the case with a fluid valve, the pressure $P_2$ acting upon the exposed outer surface area of the gate 67 and the diverter 69 would offer little assistance to the actuation force $F_1$. Thus, neglecting the effects of $P_2$ and any frictional forces involved, the actuation force needed to translate the gate 67 to an open position must exceed the force $$P_1A_g - P_1A_g + P_1A_k - P_1A_k - P_1A_s = -P_1A_s$$

That is, all the forces acting upon the gate are balanced by equal but opposite forces except for the force $P_1A_s$ acting upon the lower surface of the stem 71. This force, $P_1A_s$, being in an upward direction, tends to translate the gate 67 to an open position and thus actually assists the actuation means in opening the gate 67.

The components of the valve shown in FIG. 5 are exposed to tensile and shear stresses weaker than those experienced by the components of the valve of FIG. 4. Nevertheless, significant tensile and shear stresses may be present. For example, the interior of the diverter 69 is subjected to the pressure inside the housing 65. Therefore, there is a force equal to $$F = P_1A_k$$

where $P_1$ is the pressure inside housing 65 and $A_k$ is the surface area of the bottom area inside the diverter, which is forcing the diverter 69 out opening 73. To counteract this force, the diverter is screwed into housing 65. As a result, the screw threads of the diverter 69 and the housing 65 are subjected to tremendous shear forces.

As compared to these prior designs, the design according to the present invention permits maintenance of primarily compressive forces in the body and rods of the gate. It also reduces gate shear stresses by shifting pressure balance loads into the large body of the gate from the thin spider, for example, in the design of FIG. 5.

Also, as can be seen in FIG. 1, the interior of diverter 15 is not subjected to the pressure inside housing 39. As a result, the shear force on the connection between the diverter 15 and the housing 39 is greatly reduced.

As a result, the present invention removes constraints and permits the valve designer a wider range of choices of valve component materials. For example, the designer would be free to use materials having good compressive strength but only moderate or poor tensile or shear strength, such as refractory materials. These materials include carbonaceous structural materials such as graphite, carbon/carbon, vitreous carbon and ceramics which are capable of withstanding extremely high or low temperatures.

In addition, the diverter 15 helps to reduce the shear stress on the gate rods 13 and 35. The diverter 15 is designed to form a tight slidable connection between the diverter 15 and the gate 11. As a result of the tight connection, the diverter 15 prevents the gate 11 from twisting thereby reducing the shear stress on the gate rods.

Also the present invention allows simplified design and fabrication of the gate and diverter. The components are easier to make. This also permits the use of a greater variety of materials.

Figure 6:
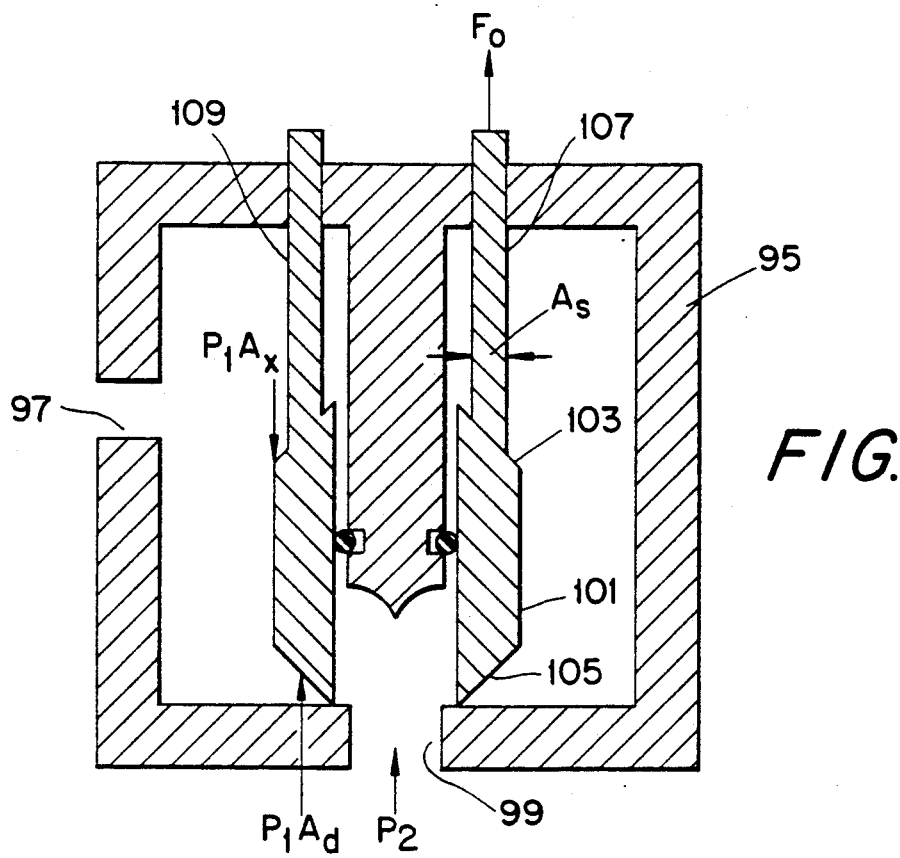
FIG. 6 is a cross-sectional view of a second embodiment of the present invention where the gate is configured to be pressure biased in the open direction.

FIG. 6 shows a second embodiment of the present invention where the gate 101 is pressure biased in the opening direction. The housing 95 has an inlet opening 97 and an outlet opening 99. The housing 95 also contains a gate 101 which meters the flow of fluid through the housing.

The bottom edge 105 is beveled and both the top edge 103 and the bottom edge 105 of the gate 101 are exposed to the fluid pressure within the housing 95. $A_x$ represents the total surface area of the top edge 103 of the gate. $A_s$ represents the surface area of the top edge 103 which is covered by the gate rods 107 and 109. $A_d$ represents the surface area of the bottom edge 105. $P_1$ represents the fluid pressure within the housing 95 and $P_2$ represents the fluid pressure outside the housing 95. Since the pressure $P_2$ does not apply a force on the gate in an axial direction, the pressure can be neglected. Therefore, the axial force, $F_o$, on the gate 95 is equal to $$F_o = P_1(A_x - A_s) - P_1A_d$$

Since the area of the gate top 103 is smaller than the area of the gate bottom 105, the pressure inside housing 95 will exert a force upon gate 101 in an upward or opening direction. As a result, the gate will always be under compressive forces when the gate is surrounded by fluid.

The amount of force can be changed by increasing or decreasing the diameter of the gate rods 107. By increasing the diameter of the gate rods 107, the total area of the top edge 103 of the gate exposed to the pressure $P_1$ decreases thereby increasing the force exerted upon the gate in the upward or opening direction. Conversely, if the diameter of the gate rods 107 is decreased, the total area of the top edge 103 of the gate exposed to the pressure $P_1$ increases thereby decreasing the force exerted upon the gate in the upward or opening direction. Alternatively, the axial force can be changed by modifying the lower sealing edge so as to expose to the pressure, $P_1$, a different $A_d$.

Several other features of the present invention reduce the amount of shear stress being applied to the gate 11. First of all, the gate 11 is always under a compressive force when it is surrounded by a fluid. The compressive force upon the gate makes the gate less susceptible to tensile stress. In addition, since the gate rods 13 and 35 extend out of the body of gate 11, the shear stress along the gate rods is greatly reduced because the stress is spread out through the entire gate.

It is to be understood that this invention is not limited to the particular embodiments disclosed and it is intended to cover all modifications coming within the true spirit and scope of this invention as claimed.

What is claimed is:

1. A high force gain valve comprising:
   a housing containing a first and second opening, one of said openings being in fluid communication with a fluid source;
   a diverter fixed within said housing to divert fluid out said second opening;
   a gate disposed within said housing, said gate having a gate body which is movable to open and closed positions, said gate having at least two rods that extend from said gate body and out of said housing; and
   actuation means for moving and positioning of said gate between said open and closed positions.

2. The valve of claim 1 wherein said diverter is surrounded by said gate.

3. The valve of claim 1 wherein said diverter is solid.

4. The valve of claim 1 wherein an interior portion of said diverter is not in fluid communication with said fluid.

5. The valve of claim 1 wherein said rods are coupled to said actuation means.

6. The valve of claim 1 wherein said actuation means comprises a servohydraulic actuator.

7. The valve of claim 1 wherein said gate has a top edge and a bottom edge.

8. The valve of claim 7 wherein a projected area of said bottom edge is greater than a projected area of said top edge so that said gate is pressure biased in the open direction.

9. The valve of claim 8 wherein said gate is not subjected to substantial shear or tensile stresses.

10. The valve of claim 1 wherein a main body of said gate is substantially cylindrical.

11. A high force gain valve comprising:
a housing containing a first and second opening, one of said openings being in fluid communication with a fluid source;
a diverter fixed within said housing to divert fluid out said second opening;
a gate disposed within said housing, said gate having a hollow gate body surrounding said diverter, said gate being movable to open and closed positions, said gate being opposite said second opening such that a sealing edge of said gate surrounds said second opening when said gate is in said closed position, said diverter being opposite said second opening and spaced from said second opening so as to allow an unobstructed fluid flow path through said second opening when said gate is in said open position, said gate having at least two rods extending from said gate body and out of said housing; and
actuation means for moving and positioning of said gate between said open and closed positions.

12. The valve of claim 11 wherein an interior portion of said diverter is not in fluid communication with said fluid.

13. The valve of claim 11 wherein said diverter is surrounded by said gate.

14. The valve of claim 11 wherein said diverter is solid.

15. The valve of claim 11 wherein said gate rods are coupled to said actuation means.

16. The valve of claim 11 wherein said actuation means comprises a servohydraulic actuator.

17. The valve of claim 11 wherein said gate has a top edge and a bottom edge.

18. The valve of claim 17 wherein a projected area of said bottom edge is greater than a projected area of said top edge so that said gate is pressure biased in the open direction.

19. The valve of claim 18 wherein said gate is not subjected to substantial shear or tensile stresses.

20. The valve of claim 11 wherein said housing is configured such that said second opening comprises the entrance of a nozzle.

21. The valve of claim 11 wherein a portion of said gate is surrounded by a flame shield.

22. The valve of claim 11 wherein said valve is constructed of high temperature refractory materials.

23. The valve of claim 22 wherein said high temperature refractory materials are taken from the group containing graphite, carbon/carbon, vitreous carbon and ceramics.

24. The valve of claim 11 wherein a main body of said gate is substantially cylindrical.

* * * * *